(No Model.)  8 Sheets—Sheet 1.

G. F. EISENHARDT.
APPARATUS FOR PRINTING OIL CLOTH.

No. 476,135. Patented May 31, 1892.

WITNESSES
Jno. G. Hinkel
H. S. McArthur

INVENTOR
Geo. F. Eisenhardt
by Foster and Freeman,
Attorneys (No Model.) 8 Sheets—Sheet 4.
G. F. EISENHARDT.
APPARATUS FOR PRINTING OIL CLOTH.

No. 476,135. Patented May 31, 1892.

WITNESSES
INVENTOR
George F. Eisenhardt
by Foster and Freeman,
Attorneys.

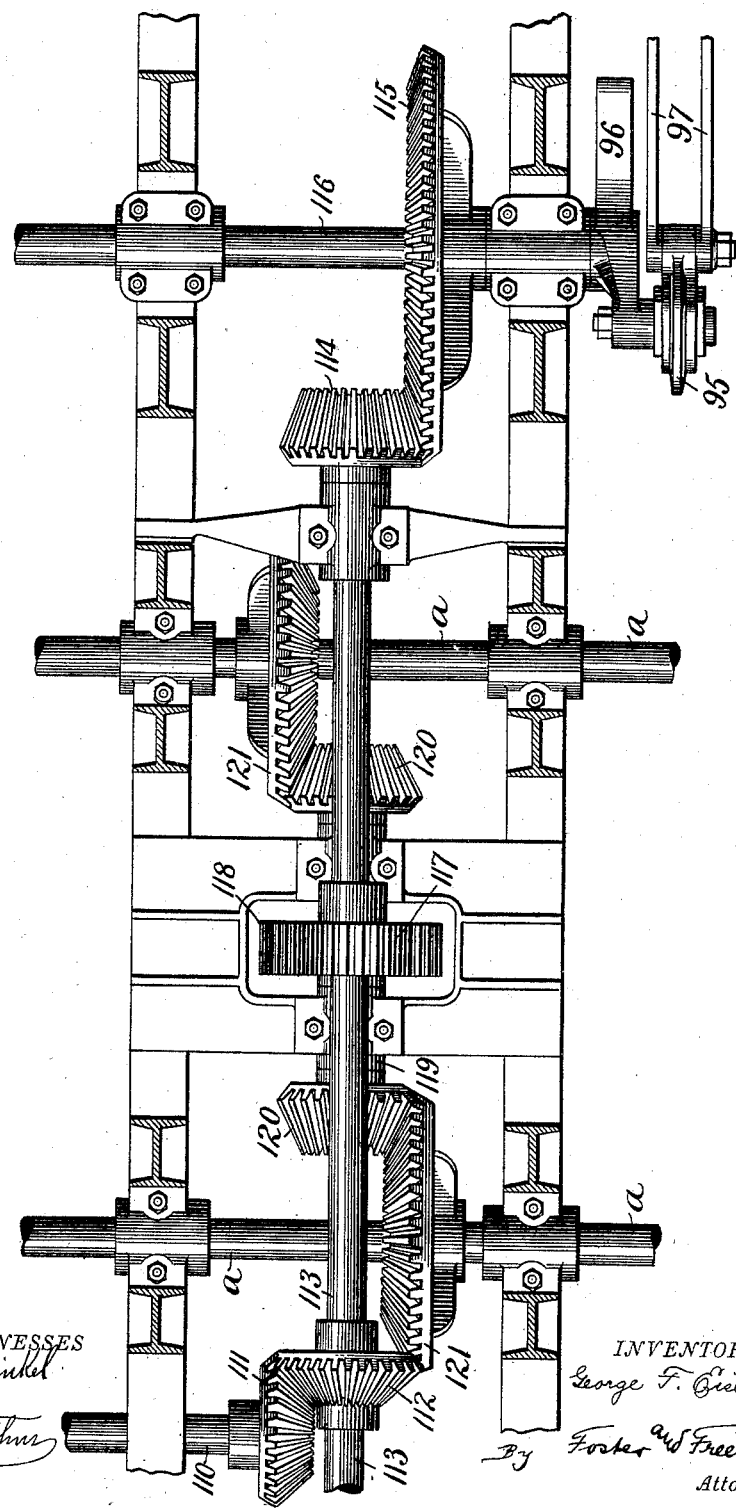

(No Model.) 8 Sheets—Sheet 6.

G. F. EISENHARDT.
APPARATUS FOR PRINTING OIL CLOTH.

No. 476,135. Patented May 31, 1892.

WITNESSES
Jno. G. Hinkel
H. S. McArthur

INVENTOR
George F. Eisenhardt
By Foster and Freeman,
Attorneys.

(No Model.) 8 Sheets—Sheet 7.
G. F. EISENHARDT.
APPARATUS FOR PRINTING OIL CLOTH.
No. 476,135. Patented May 31, 1892.
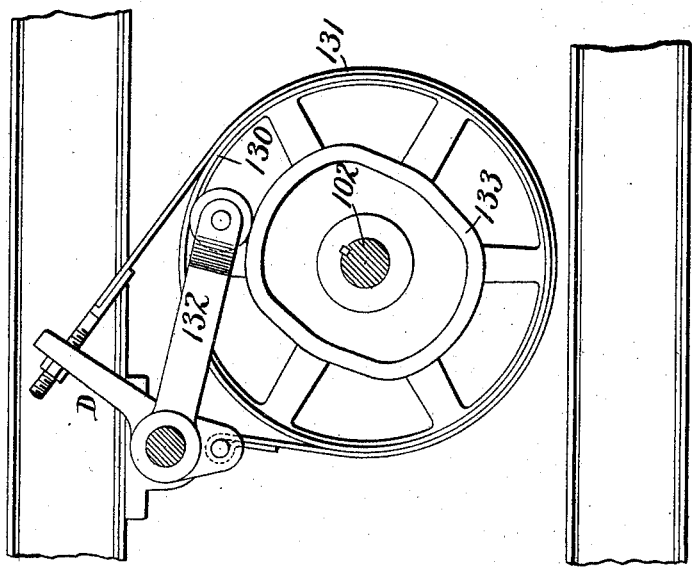
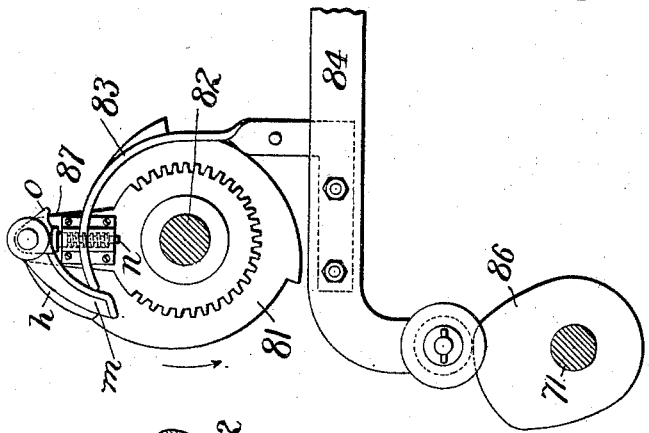
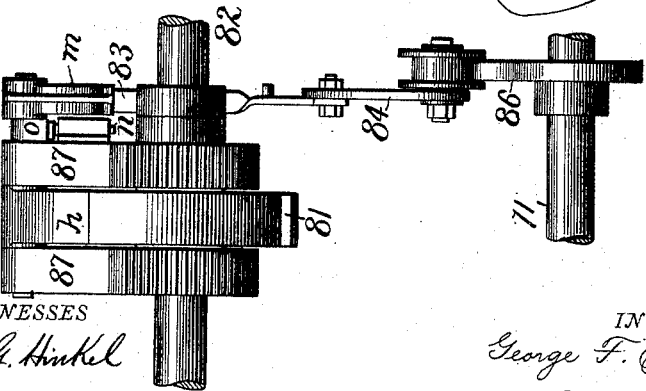
WITNESSES
Jno. G. Hinkel
H. S. McArthur
INVENTOR
George F. Eisenhardt.
By Foster and Freeman,
Attorneys

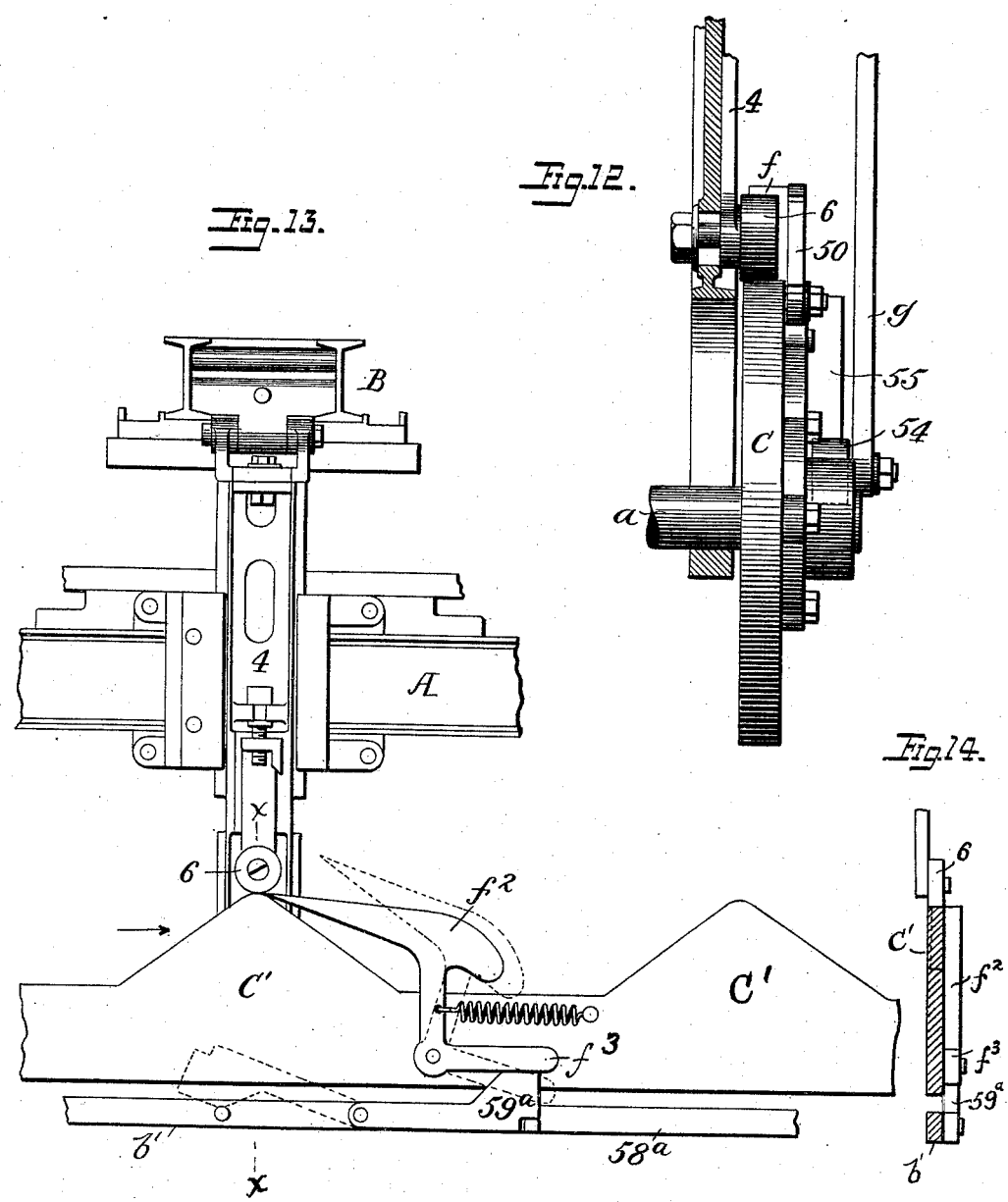

UNITED STATES PATENT OFFICE.

GEORGE F. EISENHARDT, OF PHILADELPHIA, PENNSYLVANIA.

APPARATUS FOR PRINTING OIL-CLOTH.

SPECIFICATION forming part of Letters Patent No. 476,135, dated May 31, 1892.

Application filed July 31, 1891. Serial No. 401,295. (No model.)

*To all whom it may concern:*

Be it known that I, GEORGE F. EISENHARDT, a citizen of the United States, residing in the city and county of Philadelphia, and State of Pennsylvania, have invented certain new and useful Improvements in Apparatus for Printing Oil-Cloth, (for which I have applied for Letters Patent in Great Britain, filed February 6, 1892, No. 2,316, and in Germany February 6, 1892, No. 30,307,) of which the following is a specification.

My invention relates to apparatus for printing oil-cloth; and it consists in certain improvements for facilitating and improving the different parts of the apparatus, as fully set forth hereinafter, and as illustrated in the accompanying drawings, in which—

Figure 1:
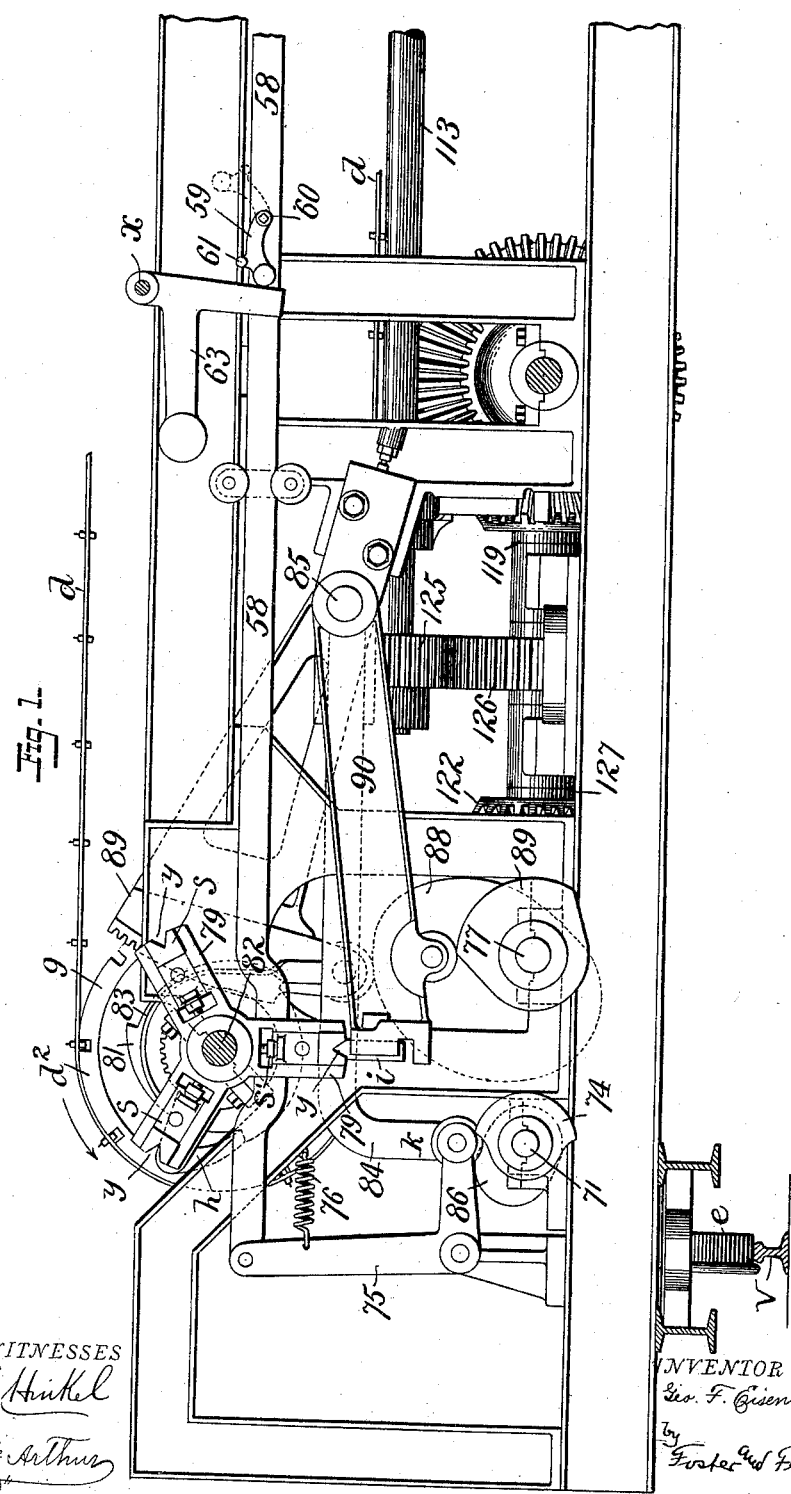
Figure 2:
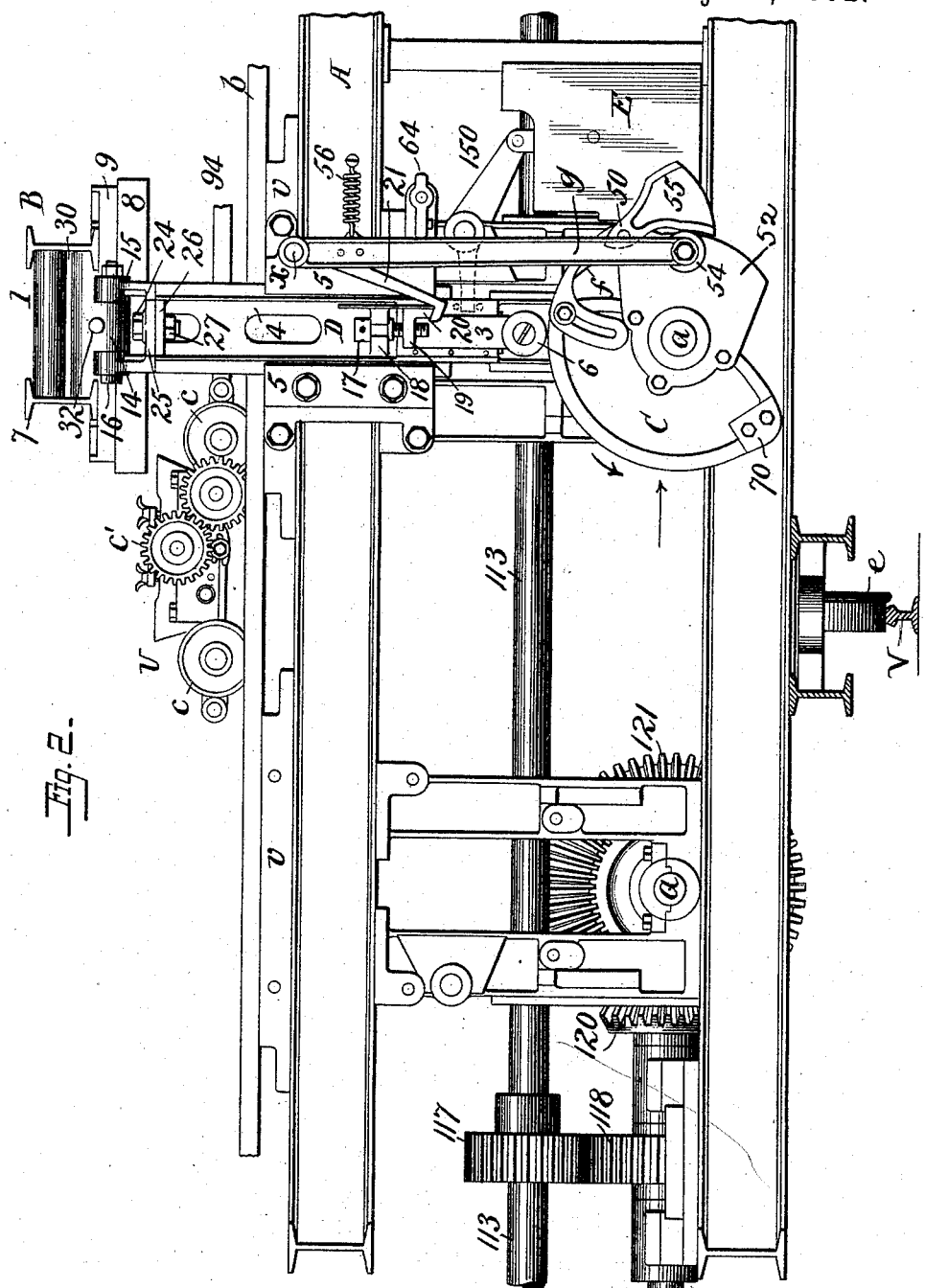
Figure 3:
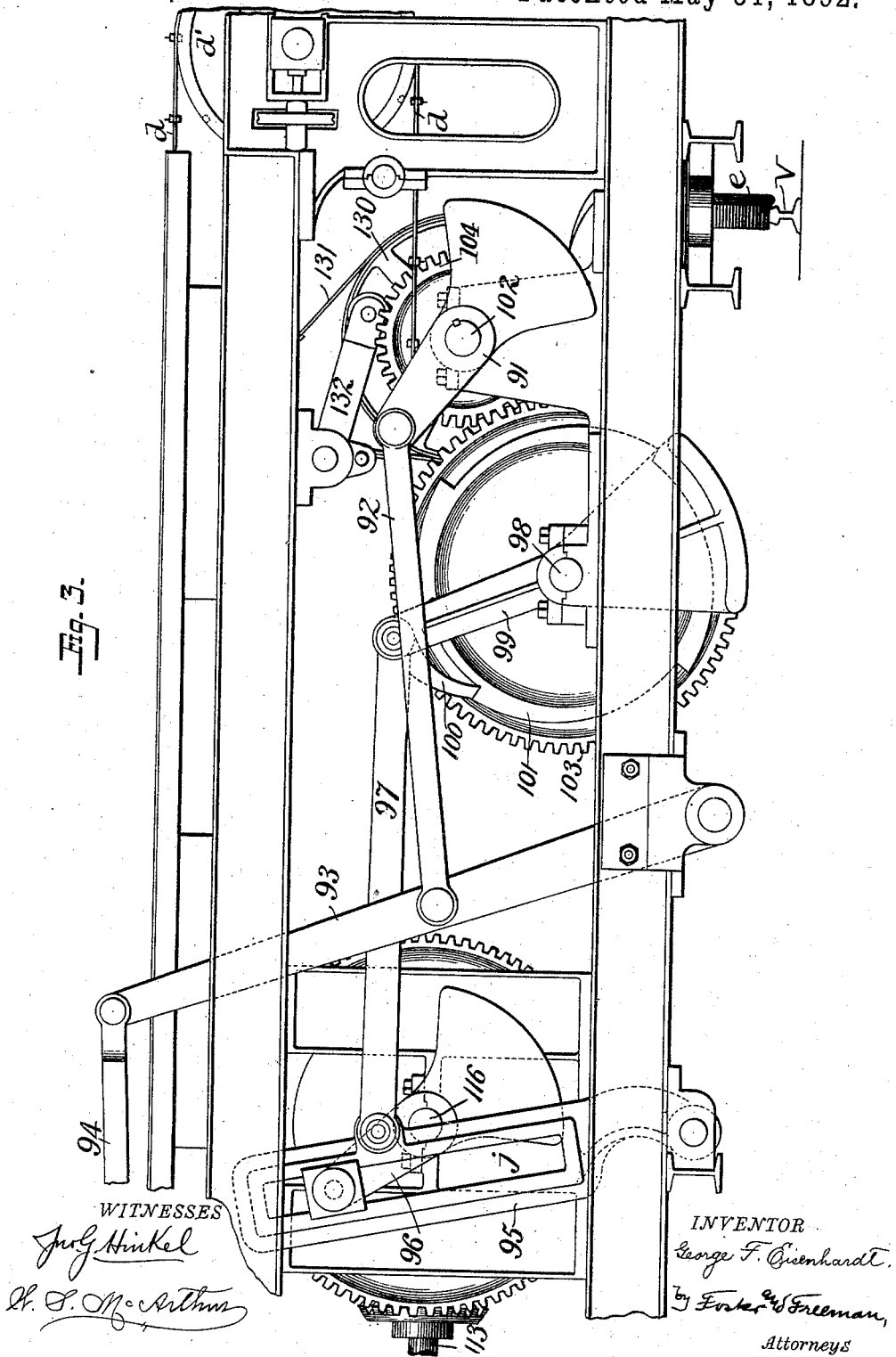
Figure 4:
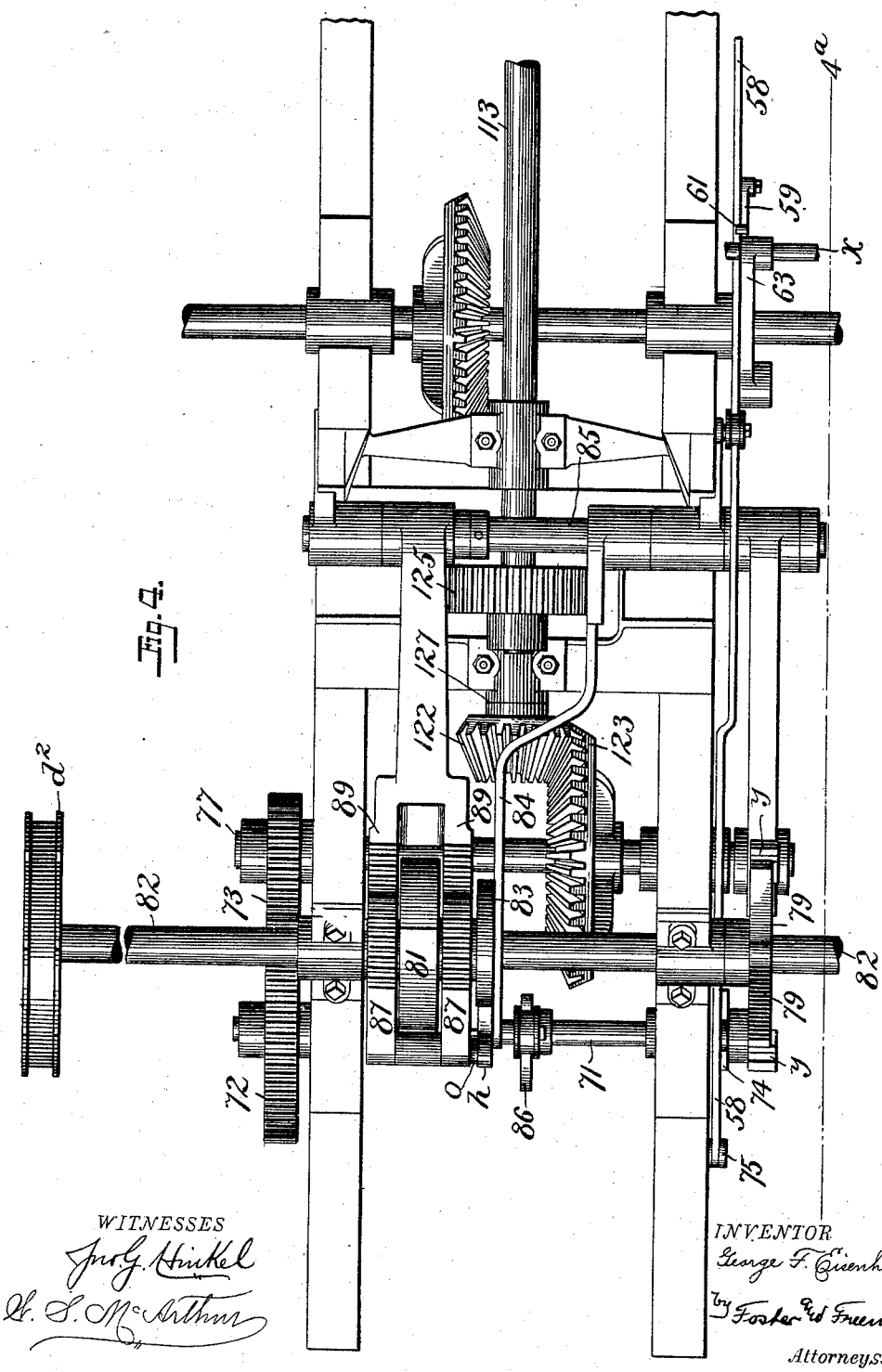
Figure 11:
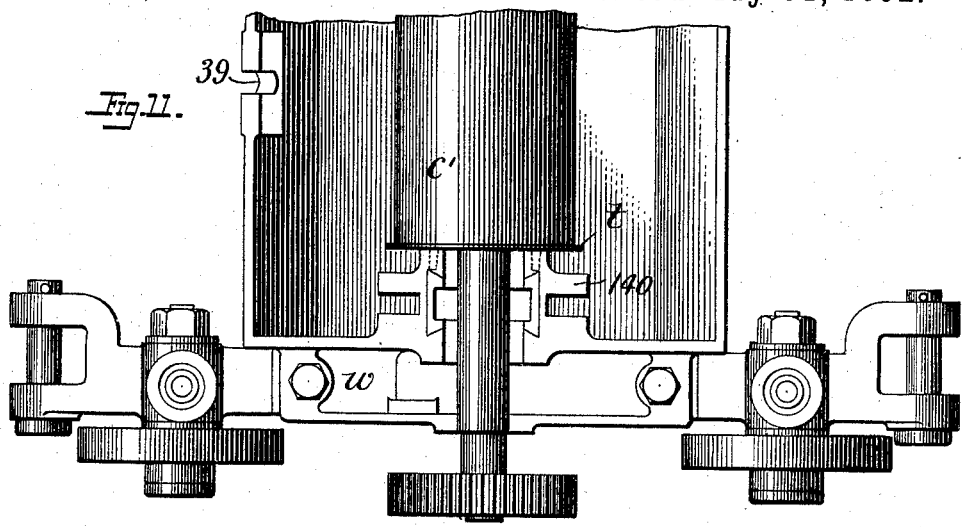
Figures 6, 7:
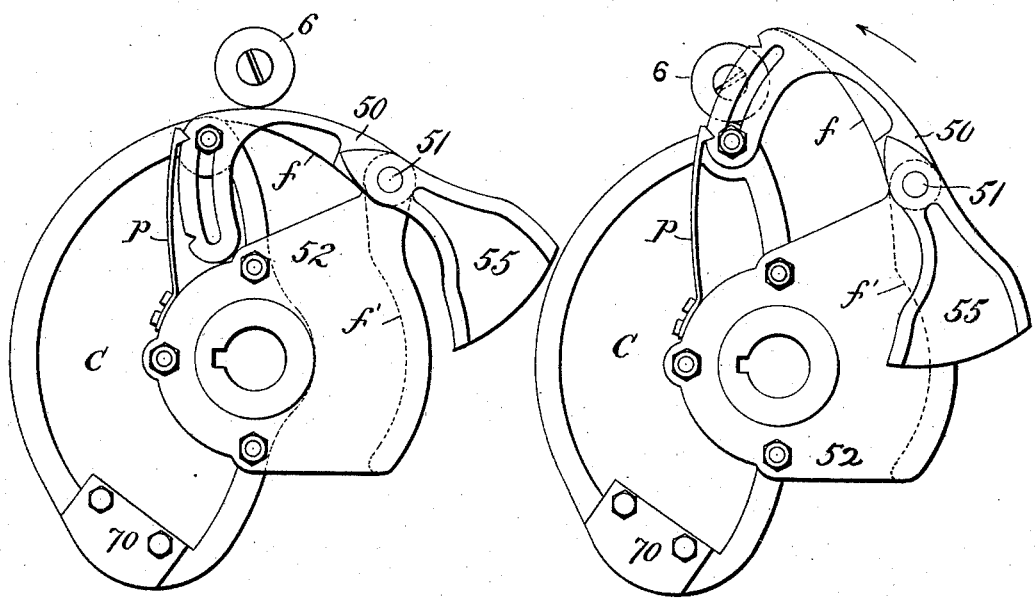

Figure 1 is a longitudinal sectional elevation on the plane $4^a$, Fig. 4, showing the parts at one end of my improved apparatus. Fig. 2 is an external elevation showing one side of the apparatus adjacent to one of the printing-frames. Fig. 3 is an external elevation showing the end of the apparatus opposite that shown in Fig. 1. Fig. 4 is a plan showing the parts illustrated in Fig. 1. Fig. 5 is a plan showing the gearing between the cross-shafts $a$ and the main and counter shafts. Figs. 6 and 7 are enlarged face views showing the cams for operating the printing-frames. Figs. 8 and 9 are enlarged detail views of the means for operating the carrying-bands. Fig. 10 is an enlarged detail of the brake mechanism. Fig. 11 is an enlarged plan of one of the ink troughs and rollers. Fig. 12 is a view looking at the edge of the printing-frame cams in the direction of the arrow, Fig. 2. Fig. 13 is a view illustrating a modification; and Fig. 14 is a cross-section on the line $x\,x$, Fig. 13, looking in the direction of the arrow.

The completed machine has a frame-work supporting carriers for the oil-cloth or other fabric to be printed, means for moving said fabric intermittently, a series of vertically-reciprocating frames extending each transversely over the path of the fabric and each supporting printing-blocks, means for operating said printing-block frames, and devices for applying colors to the blocks, the machine in these respects having the general appliances and performing the functions of other oil-cloth-printing machines.

In the drawings I have represented only a single one of the printing-block frames, although in practice there is frequently a dozen or more, and I have omitted some details that do not differ essentially from those heretofore in use.

The frame A is of suitable construction to support the parts hereinafter described, having truck-wheels $e$, moving on transverse rails V, and provided with guides for printing-frames, Fig. 2, one of which only is shown supporting inverted printing-blocks 8, which extend transversely above a suitable platen or bed $v$, supported by the frame, and upon side rails $b$ bear the wheels $c\,c$ of an inking-trough U, in which turns an inking-roller $c'$, in position to deposit a layer of ink upon the printing-face of each block 8 as the trough U is carried beneath the latter in one direction or the other. The fabric upon which a succession of impressions is to be made by a succession of blocks 8 is carried over the platen or bed $v$ by means of a series of bands $d$, provided with points for taking hold of the fabric and passing each around two rollers or wheels $d'\,d^2$, which are turned intermittently only when the printing-blocks are in an elevated position, all of said blocks being raised and lowered simultaneously.

When the ink is thick or opaque, a sufficient body thereof may be applied to the face of the inking-block to make the requisite impression upon a single action of said block; but in many cases the inks or paints are necessarily so thin or transparent that a single impression will not apply a sufficient body of material, and I therefore have devised improved means whereby any one or more of the said printing-blocks may be held in an elevated position at alternate strokes, so as to permit the remaining block or blocks to be twice inked and twice applied upon the same portions of the fabric, the feeding of which in such case is temporarily and for such stroke suspended. Thus in the construction shown the frame B, that supports the printing-blocks, is provided at each end with a side piece 4, moving between guides 5 5 at the side of the main frame A, and upon a stud projecting from each side piece 4 turns an anti-friction roller 6, bearing upon the edge of a cam C upon each end of a transverse or cross shaft $a$, turning in bearings on the frame A. The cam C is so shaped that during about one-half of the revolution of the cross-shaft $a$ it will hold the printing-frame B in its elevated position, and will then permit it to descend by a quick motion to bring the type against the material.

Heretofore the weight of the printing-frame has usually been depended upon to insure its descent; but it has been found that in printing with rapidity it is necessary to accelerate the downward movement of the said frame, and in order to avoid the objections incident to the use of springs or weights for the purposes of such acceleration I make use of a cam of the character hereinafter described, which operates positively to effect the desired movement. Such cam may be constructed in any suitable manner to revolve or reciprocate; but I prefer to provide the cam C with a secondary or supplemental cam $f$, (see Figs. 2, 6, and 7,) that comes above the roller 6 as the latter passes the point of the cam C, and thereby draws down the roller and the printing-frame with a positive action throughout the whole extent of the downward movement, and further serves to give the final impression of the printing-block against the material. The supplemental cam $f$ is preferably secured to the cam C and is movable in whole or in part thereon, so as to also provide means for holding the printing-frame in its elevated position whenever it is necessary for one of the other blocks to make two successive impressions. Thus the supplemental cam $f$ is upon an arm or lever 50, pivoted at 51 to a side piece 52 of the cam C, so that when the cam $f$ is in the position shown in Fig. 7 and the cross-shaft $a$ revolves in the direction of the arrow the said cam $f$ will come above the roller 6 and depress the printing-frame positively, the roller 6 passing from the pivoted portion of the cam beneath an inner fixed flange $f'$ upon the side piece or plate 52, fixed to the cam C, which flange $f'$ is of such a curve as to draw down the roller 6 to its full extent with a final movement that gives the requisite terminal pressure to the printing-block. When, however, the printing-frame is not to descend, the cam $f$ is swung to bring its point against the edge of the cam C, as in Figs. 2 and 6, forming, practically, a continuation of the latter, so that the said cam $f$ will pass below the roller 6 when the latter is not to descend with the printing-frame. A spring locking-lever $p$ engages notches in the cam-lever 50 and tends to hold it in either position to which it is set.

The printing-frame is held at the limit of its upward movement when it is to be kept out of printing position by means of a catch or detent 21 engaging a lug 20 upon each side of the printing-frame, and, as shown, the said catch 21 is part of a catch-lever $g$, pivoted at $x$ to the frame A and carrying at the lower end a roller 54, adapted to engage the outwardly-projecting edges of a fantailed end 55 of the cam-lever 50, so that when the catch and lever are in the position shown in Fig. 2 the roller 54 will pass to the inner side or edge of the end 55, and the further revolution of the cross-shaft $a$ will cause the cam $f$ to be swung down toward the cam C to pass beneath the roller 6. When, on the contrary, the lever $g$ and catch are swung to the right to release the printing-frame, then the roller 54 will pass to the outside of the end 55, and its contact with the latter will swing the cam $f$ outward, so that it will pass above the lug or roller 6 and will draw the latter and the printing-frame downward.

The cams C, levers $g$, and adjuncts are duplicated on opposite sides of the machine and each pair of levers $g$ is on a transverse rock-shaft $x$, to which is secured a weighted lever 63, Fig. 1, which tends to automatically carry the levers $g$ and their catches from the lugs or stops 20.

In order that the catches or detents may be brought to engage the lugs or stops, I make use of a reciprocating bar 58, sliding within the frame and provided with pawls 59, each pivoted to a pin 60 and having a lug 61, so that it may be turned to the point shown in full lines, Fig. 1, to make contact with the adjacent lever 63 or back to the position shown in dotted lines, so as to be out of contact with the lever. Thus all of the pawls that are thrown to the position shown in full lines will at one movement of the bar 58 make contact with the adjacent lever 63 and will carry the connected levers $g$ and detents 21 into a position to engage the stops 20, while at the points where the pawls 59 are turned back to the position shown in dotted lines the weighted levers 63 will hold the levers $g$ and detents 21 away so as not to make contact with the stops. The detents may be held in contact with the stops by reversible dogs 64, pivoted to the frame in the path of the levers $g$, as shown in Fig. 2.

In order to release each lever $g$ and detent 21, each cam C is provided with a swell 70, which slightly lifts the frame B at the beginning of each movement to thereby permit the catch or detent 21 to escape contact with the lug 20, if its connected lever 63 is free to swing. It will therefore be seen that by adjusting the pawls 59, as required, any one of the printing-frames may be caused to descend either at each revolution or at each alternate revolution of the cam-shaft, and by turning forward any pawl 59 the connected frame B may be permanently held up.

It will be evident that when reciprocating cams C' are used, as illustrated in Fig. 13, they may be provided with movable sections $f^2$ for positively drawing down the frames, and that like means may be employed for throwing such sections into and out of operation with the same effect as when revolving cams are employed—as, for instance, a reciprocating bar 58ª, with pawl-cams 59ª, engaging arms $f^3$ of said sections $f^2$ when said pawl-cams are in the position shown in full lines in said Fig. 13.

Any of the various mechanical movements may be employed for imparting sliding movements to the bar 58 at alternate strokes. Thus a shaft 71, having a gear 72, Figs. 1 and 4, is geared through the medium of a pinion 73 of half the size with a shaft 77, so that the shaft 71 makes one revolution to every two revolutions of the shaft 77, and said shaft 71 carries a cam 74, that operates upon a bell-crank lever 75, connected with the bar 58 to move it in one direction, while a spring 76 imparts the reverse movement to the lever 75 and bar.

Each movement of the feeding-bands $d$ is sufficient to carry the material from a position beneath one block to its proper position to be printed by the next block, and it is exceedingly important that each movement shall bring the material operated upon to register with the utmost precision, so that the successive prints shall be effected without any improper overlapping of the impressions. To secure this result, I combine with the devices of any suitable kind for intermittently rotating the band-carrying shafts additional means for carrying each shaft and the bands to the exact position required at the completion of each feeding movement. One form of registering device, as illustrated in the drawings, Fig. 1, consists of V-shaped notches $y$, formed in the ends of arms 79 on a shaft 82, carrying the wheel or roller $d^2$, and a reciprocating dog $i$, having a wedge or V shaped end adapted to enter said notches, and so arranged that when said end of the dog is fully in any one of said notches the band-carrying wheel will be exactly in the position required to hold the band and the material in position to properly register with the printing-blocks. Means are employed for forcibly moving the dog $i$ back and forth at proper intervals, and after the band-carrying wheel has been moved by the feeding mechanism the movement of the dog $i$ will bring the wheel exactly to its position if said wheel has failed to move to its full extent or has moved to a greater extent than is necessary. As shown, the dog $i$ is carried by an arm 90, pivoted at 85 and vibrated by a cam 89 on the shaft 77, and each notch $y$ is formed in a block $s$, adjustable in a slot in the arm 79 by an adjusting-screw $s'$ to set it in exact position. The mechanism for feeding the bands may be of any suitable character, but, as shown, consists of a ratchet-wheel 81, Figs. 1, 4, 8, and 9, upon the shaft 82, carrying the band-wheels $d^2$ at one end of the machine, and a reciprocating pawl $h$, which engages said ratchet-wheel and turns the same, with the shaft and band-carrying wheels, in the direction of the arrow, Fig. 1, at each forward movement when the pawl is down; but a contact-piece 83 is carried into position at every alternate stroke to hold up the pawl by contact with an arm $m$ on the pawl-shaft, so that the fabric in such case is only fed at every alternate revolution, as is necessary when the printing-blocks or any of them must make two successive impressions at the same point. As shown, the contact-piece 83 is upon a lever 84, pivoted at 85 and having a toe bearing upon a cam 86 on the shaft 71, which, as it revolves once to every alternate stroke of the printing-frame, causes the pawl $h$ to be held out of action at every alternate stroke. The pawl $h$ is carried by arms 87, swinging upon the shaft 82 and having teeth gearing with sectors 89, Figs. 1 and 4, swinging upon the fulcrum 85, and lifted at every revolution of the shaft 77 by a cam 88 on said shaft, and said shaft 77 also carries a cam 89, that operates upon a toe of the arm 90, as stated. A spring-actuated rod $n$ bears on a toe $o$ on the pawl-shaft and tends to throw it down against the ratchet. To avoid the necessity of moving the full weight of the printing-frame, I counterbalance the same, as by weights E, Fig. 2, hung to a lever 150, pivoted to the frame and each having a short arm engaging bearings on the adjacent side bar of the frame B.

It is desirable to lock the ink-trough at the limit of its position after each movement, so that it cannot be displaced and brought accidentally against the printing-frame when the latter is down or movable. For this reason I combine with each inking-trough devices, Figs. 2 and 3, connected with a crank-shaft or crank-arm 91 on a shaft 102 through the medium of a lever 93 and connecting-bars 92 94, and bring the said shaft to a position to carry the cranks to a dead-center at the limit of each movement. These parts may be driven by different mechanisms. Thus a vibratory lever 95 is driven by a crank 96 on a shaft 116, the pin of which crank enters a slot $j$ in said lever, and the latter is connected by a rod 97 with an arm 99 on a shaft 98, which arm 99 carries a pawl 100, engaging with the notches of a ratchet-wheel 101 upon the shaft 98, and the latter is geared with the crank-shaft 102 through the medium of gears 103 104. The gears are so proportioned that as the arm 99 and its pawl completes each movement the crank of the shaft 102 will be in line with the connecting-rod 92 and the parts will be locked in position.

The above-described parts may be driven in any suitable manner from the power-shaft 110. I, however, prefer to gear said shaft 110, through the medium of gears 111 112, with a central driving-shaft 113, running the full length of the machine and having at one end a pinion 114 for gearing with a wheel 115 on the shaft 116, that carries the crank 96. Preferably at a point between each pair of printing-frames B the driving-shaft 113 has a pinion 117, gearing with a wheel 118 on a short counter-shaft 119, parallel with and below said driving-shaft, and at each end of the counter-shaft is a beveled pinion 120, gearing with a bevel-wheel 121 upon the adjacent cross-shaft $a$, the two bevel-wheels 121 being on opposite sides of said counter-shaft 119. By this means the rotation of the counter-shaft 119 is the means of driving both cross-shafts $a$ $a$ in the same direction. At the opposite end of the driving-shaft 113, Figs. 1 and 4, is a pinion 125, that gears with a toothed wheel 126 on the counter-shaft 127, that carries on its end a beveled pinion 122, gearing with a bevel-wheel 123 on the shaft 77.

As the inking-troughs are very heavy, weighing, with their attachments in a large machine, nearly two tons, and as such machines are operated quite rapidly, there is a tendency of the moving parts after they are started to carry the intermittently-moving shafts beyond their proper position. To overcome this I combine with one of the shafts—as, for instance, the shaft 102—a friction-wheel 130, Fig. 10, around which passes a flexible friction-band 131, secured to the opposite projecting arms of a three-armed lever D, pivoted to the frame of the machine, one arm 132 of the lever carrying a roller that bears on a cam 133 on the shaft 102. Said cam 133 is so constructed as to lift the arm 132 to rock the lever and contract the band after the said moving parts acquire their maximum speed, and thereby apply such friction to the friction-wheel as to resist the momentum of the parts and prevent them from traveling at too great a speed and obviates any tendency to throw the shaft or parts connected thereto, and also acts to bring the parts gradually to a state of rest without a jar at the termination of their movements.

It will be obvious that other friction devices, as ordinary air-brakes, dash-pots, &c., may be substituted for the brake devices described.

There is a tendency in all inking devices of oil-cloth machines upon the part of the paint upon the inking-roll to run off the end of the roll and onto the bearings, and thence over or through the latter to the frame. I therefore provide the trough with an independent recess or receptacle $w$, preferably at each end, and extend the journals of the inking-roller beyond the ends of the trough and across said receptacles $w$, so that any paint which passes through or over the bearings will flow into said receptacles instead of passing outside of the trough and onto the train, as usual. To prevent the tendency of the paint to work from the roll, I provide the latter at the end with a flange $t$. This flange is preferably stationary, in the form of a plate or disk projecting very slightly beyond the surface of the roll and secured to the adjacent bearing 140. This I have found reduces to a minimum the tendency of the paint to work off the roll and onto and outside of the bearing.

Without limiting myself to the precise construction and arrangement of parts shown, I claim—

1. The combination, with the printing-frame, of cams for lifting said frame and supplemental cams adjustable to depress said frame or to maintain it elevated and a flange adjacent to each supplemental cam arranged to impart the final pressure to the frame in printing, substantially as set forth.

2. The combination, with the reciprocating frames and the cams for raising the same, of secondary cams and means for adjusting the secondary cams to depress the frames or to maintain them elevated, substantially as set forth.

3. The combination, with the printing-frames of an oil-cloth-printing machine, of cams for elevating the said frames, secondary cams for depressing the same, and means for automatically shifting the secondary cams at intervals into and out of action, substantially as set forth.

4. The combination, with the printing-frames, of rotating cams arranged to make contact with rolls upon the frames and provided with secondary cams adjustable to engage the rolls from above or below, substantially as set forth.

5. The combination of the printing-frames, rotating cams for raising said frames, and secondary cams pivoted to the rotating cams, and means for shifting the secondary cams to carry them above or below the rolls on the frames, substantially as described.

6. The combination of a printing-frame having vertical side pieces and rollers 6 and cams C, arranged to act upon the rollers at one side, and movable cams $f$, arranged to act upon the rollers at the opposite side when in one position and to constitute extensions of the cams C when in the other position, substantially as set forth.

7. The combination, with the printing-frame, side pieces, and rollers 6, of revolving cams C below said rollers and supplemental cams $f$, pivoted to the cams C and adjustable to positions to pass below or above the rollers 6, substantially as set forth.

8. The combination of the printing-frame, stop, cam for lifting the frame, a movable cam for depressing the frame, a detent, and connections between the movable cam and the detent arranged to shift the movable cam according to the position of the detent, substantially as described.

9. The combination of the printing-frame, its stop and detent, cam for elevating the frame, movable cam for depressing the frame, and an arm $g$, connected with the detent and arranged in position to shift the movable cam according to the position of said arm, substantially as set forth.

10. The combination, with the printing-frame, stop, detent, and arm $g$, of a revolving cam C and cam-lever pivoted to the cam C and having a wing-shaped projection 55 arranged to engage a projection on the arm G to shift the same, substantially as set forth.

11. The combination, with the printing-frame and stops at opposite sides thereof, of detents connected to a transverse shaft $x$, means for rocking said shaft in one direction, and a longitudinal reciprocating bar 58, having a pawl movable thereon for rocking the shaft in the opposite direction, substantially as set forth.

12. The combination, with the printing-frames, stops, shafts $x$, detents, and reciprocating bar 58, of pawls on the bar adapted to be moved into and out of position to operate the shafts, substantially as described.

13. The combination, with the band-carrying wheel, the supporting-shaft, the arms, and the reciprocating dog $i$, of notched blocks $s$, adjustable upon said arms, substantially as set forth.

14. The combination, with the ink-troughs, of an operating crank-shaft and connections, including a rod, connected with said crank and arranged to occupy a position on the dead-center when the ink-troughs are in either of their extreme positions, and means for intermittently rotating said shaft, substantially as set forth.

15. The combination, with the ink-trough, crank-shaft 102, lever 93, and connecting-bars 92 94, of the crank-shaft 116, pivoted lever 95, connected with the latter, shaft 98, a ratchet thereon, arm 99, carrying a pawl engaging the ratchet, rod 97, connecting said arm and lever 95, and gearing connecting the shafts 98 and 102, substantially as and for the purpose set forth.

16. The combination, with the reciprocating trough, driving-shafts, and connections, of a brake device and means for applying the same as the troughs reach the limit of their movements in either direction, substantially as set forth.

17. The combination, with the reciprocating troughs, shaft, and connections for driving the same, of a pulley upon said shaft, a band encircling said pulley, a lever connected with the band, and a cam arranged to swing the lever to tighten the band as the troughs approach the limit of their movement in either direction, substantially as set forth.

18. The combination, with the main frame of the machine, and a series of printing-frames, cross-shafts, and frame-operating devices, of a continuous driving-shaft running the length of the machine, a counter-shaft to each pair of printing-frames, and gears between each counter-shaft and said driving-shaft and between the cross-shafts of each pair of printing-frames and each counter-shaft, substantially as set forth.

19. The combination, with the printing-frames, the driving-shaft running the length of the machine, the cross-shafts, and connections between the latter and said frames, of a counter-shaft for each pair of cross-shafts, gearing between said driving-shaft and counter-shafts, and pinions at the ends of the latter shafts, and bevel-wheels upon each pair of adjacent cross-shafts, said latter wheels being upon opposite sides of the counter-shaft, substantially as set forth.

20. The combination, with the printing-frames, cross-shafts, and connections between the latter and the frames, of a continuous driving-shaft extending the length of the machine, a counter-shaft for each pair of cross-shafts, said counter-shafts being parallel with and below the driving-shaft and gear thereto, and gearing between each counter-shaft and the adjacent pair of cross-shafts, substantially as described.

21. The combination, with the ink-trough and the inking-roller turning therein, of a stationary plate or disk at the end of the roller and forming a flange projecting beyond its surface, substantially as described.

In testimony whereof I have signed my name to this specification in the presence of two subscribing witnesses.

GEORGE F. EISENHARDT.

Witnesses:
  WM. F. SIEGENER,
  WILLIAM H. DOERING.